Dec. 9, 1930. H. GLAENZER 1,784,790
ENGINE TRUCK ON WHICH BOOSTERS ARE MOUNTED
Filed Jan. 25, 1930 3 Sheets-Sheet 3
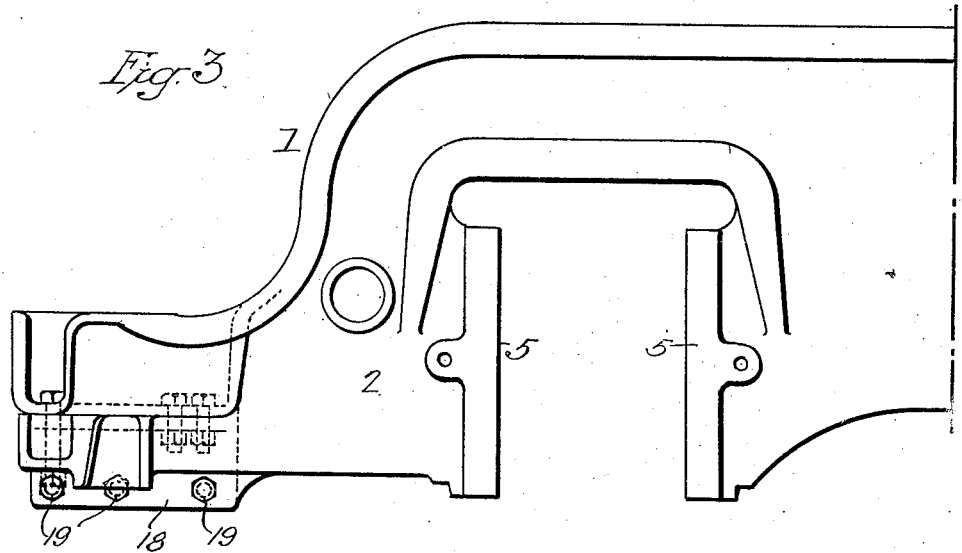
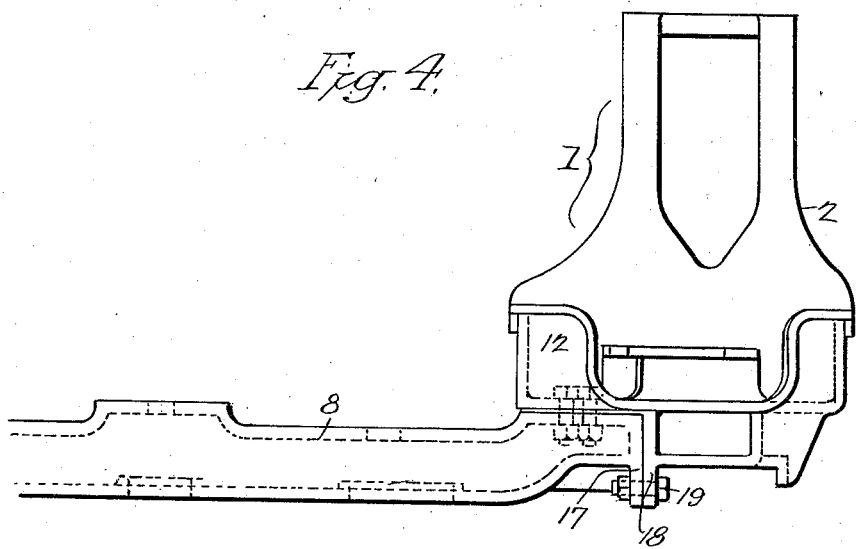
Inventor
Harry Glaenzer
by his Attorneys
Howson & Howson Patented Dec. 9, 1930

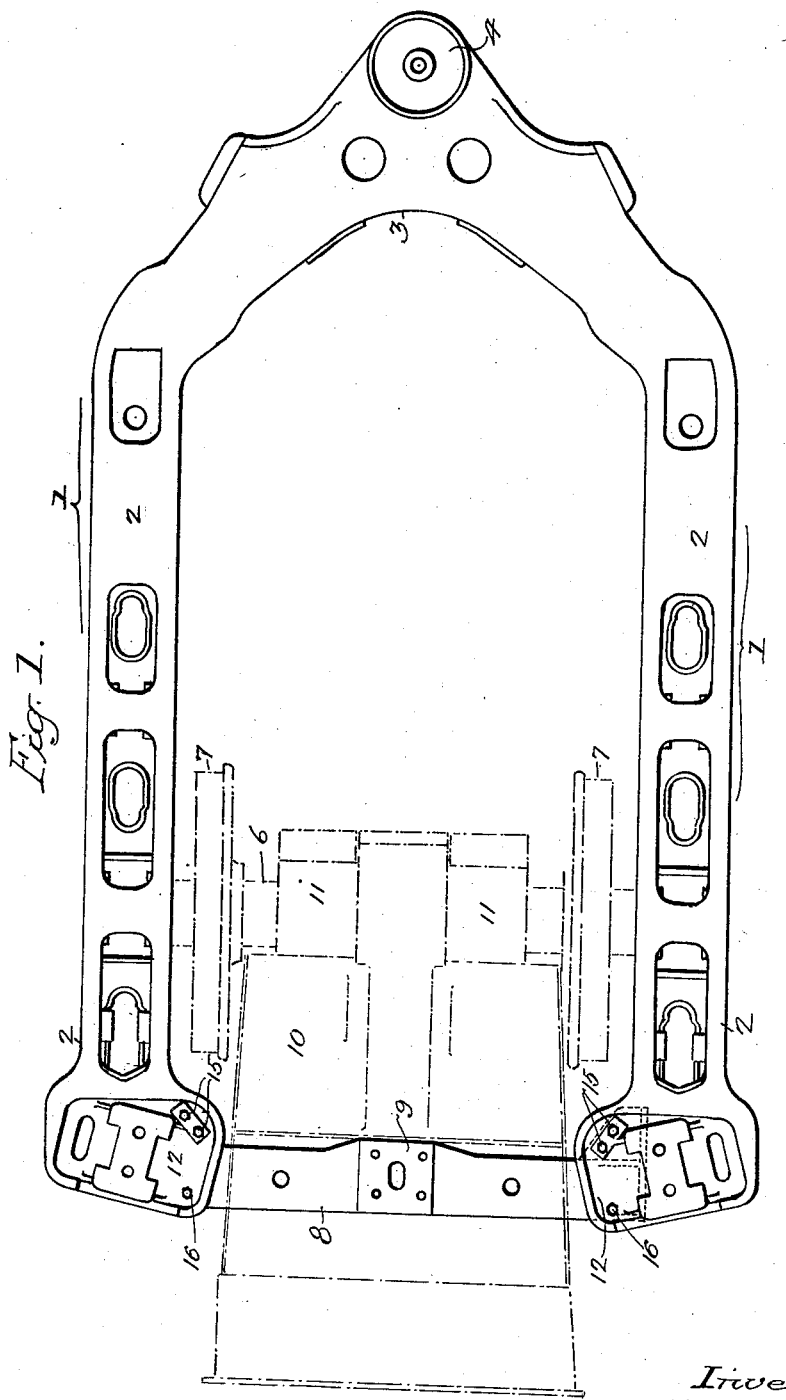

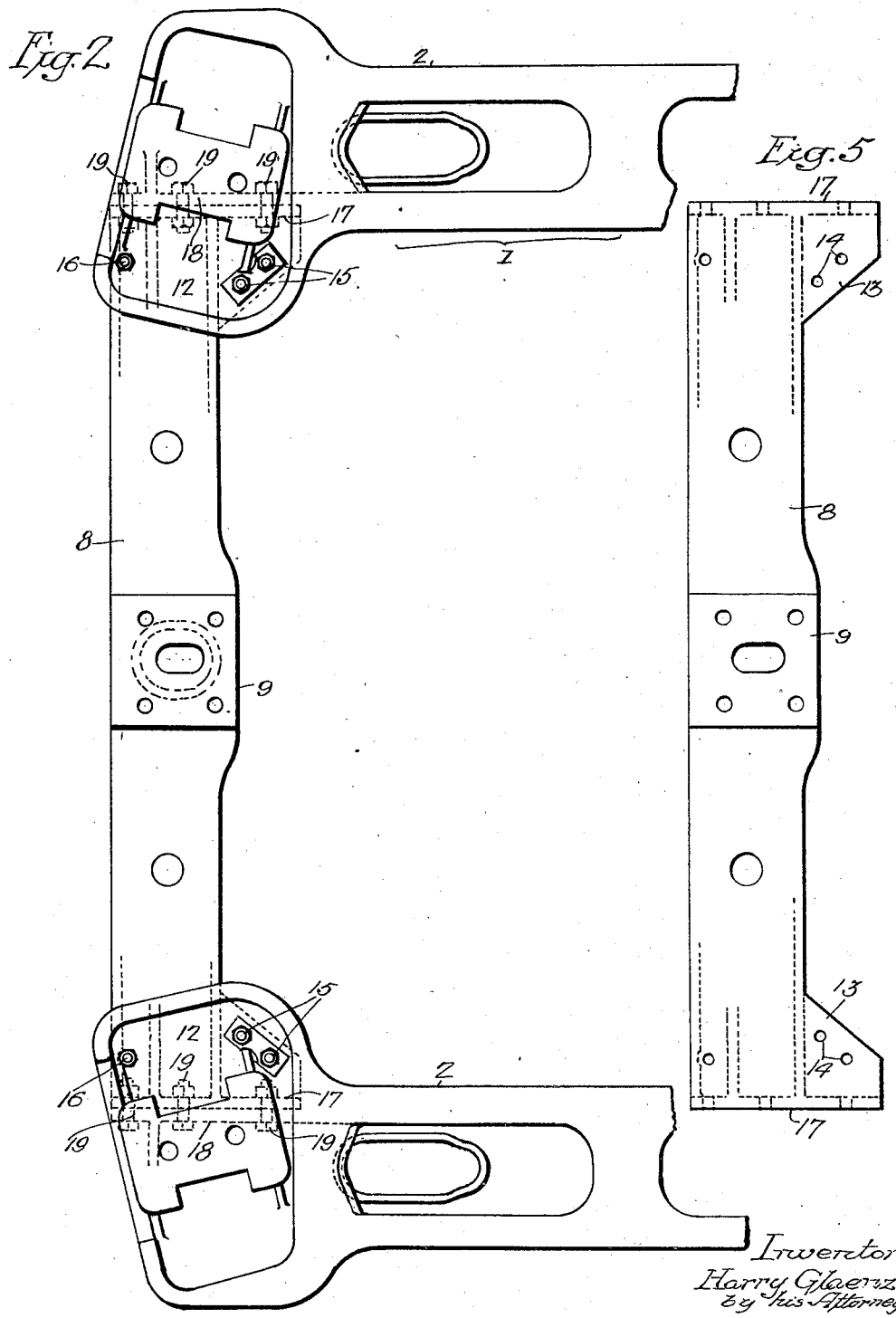

1,784,790

UNITED STATES PATENT OFFICE

HARRY GLAENZER, OF PHILADELPHIA, PENNSYLVANIA

ENGINE TRUCK ON WHICH BOOSTERS ARE MOUNTED

Application filed January 25, 1930. Serial No. 423,472.

My invention relates to certain improvements in the rear trucks of locomotives on which boosters are mounted. Heretofore the rear rails of the trucks were made an integral part of the frame, so that when it was necessary to remove the booster structure from the truck, the rear end of the locomotive had to be jacked up or the truck detached from the locomotive.

One object of my invention is to allow the booster frame to be removed from the truck while under the locomotive and without the necessity of jacking up the rear of the locomotive.

A further object of the invention is to make the rear transverse rail of the truck so that it can be removed from the frame of the truck to allow access to the booster structure.

A still further object of the invention is to so design the joints between the transverse rail and the main frame of the truck that the transverse rail will be rigid and firmly support the overhanging portion of the booster structure.

In the accompanying drawings:

Figure 1 is a plan view of a rear truck of a locomotive, illustrating my invention and showing the booster in dotted lines;

Fig. 2 is an enlarged plan view of the rear of the truck;

Fig. 3 is a side view of the rear portion of the truck;

Fig. 4 is a rear view of one side of the truck, illustrating the joint between a side member of the truck and the rear rail; and Fig. 5 is a plan view of the detachable rear rail of the truck.

Referring to the drawings, 1 is an integral cast metal frame of a truck having side members 2—2 and a front end member 3, in which is a pivot bearing 4 for the pivot on which the truck swings. The side members have pedestals 5 for the boxes in which the axle 6 of the truck is mounted. 7 are the wheels which are secured to the axle. This particular design of frame may be modified without departing from the essential features of the invention.

A transverse rear rail 8 extends from the rear end of one side member to the rear end of the other side member and is secured thereto. This rail 8 has a center bearing 9 on which the frame 10 of a booster is mounted. This frame has bearings 11 which encircle the rear axle of the truck in the present instance. The mechanism of the booster is geared to the axle in the ordinary manner. The booster is shown simply in dotted lines, as it will be understood that the invention does not relate to the particular construction of the booster.

The main object of the invention is to make the rear rail of the truck, which supports the rear end of the booster, detachable, so that when it is desired to gain access to the booster the rear rail of the truck can be detached, when access can be had to the booster or the booster entirely removed from the truck if desired.

The connection between the detachable rail and the main frame of the truck is as follows:

The rear end of each side member is extended laterally as at 12. This provides a broad surface for the attachment of the end rail 8, and the end rail is shaped at each end as shown in Fig. 5, the portion 13 of the rail being in the form of a gusset, and in this portion are two bolt-holes 14, which align with holes in the portion 12 of the side members, and bolts 15 extend through these holes and draw the detachable rail tightly under the portion 12 of each side member. A bolt 16 also connects the parts at the outer end of the rail.

Each end 17 of the rear rail 8 abuts against a depending portion 18 of the side members of the frame and is secured to the side members by horizontal bolts 19, so that when the bolts 15, 16 and 19 are firmly seated, the detachable end rail is drawn tightly against both its horizontal and vertical bearings. This construction is very rigid, yet by removing the bolts the rail can be quickly detached from the frame.

While a four-wheel truck is used to illustrate the invention, it will be understood that the invention may be used on a truck having two wheels or one having more than four wheels.

I claim:

1. The combination in a frame for the rear swing truck of a locomotive, having integral side members and a front rail provided with a pivot bearing; and a detachable rear rail, the ends of the rear rail and the side members being offset so that the offset portions of the rail will fit the offset portions of the side members and vertical and horizontal bolts at the offset portions and securing the detachable rail to the side members of the truck frame.

2. The combination of an integral frame consisting of two side members and a front cross member, the rear ends of each side member being enlarged and having a depending portion with a detachable rear rail enlarged at the ends and having a horizontal and a vertical bearing face; and vertical and horizontal bolts securing each end of the detachable rail to the ends of the side members of the frame.

HARRY GLAENZER.